US006029347A

United States Patent [19]

Maumus et al.

[11] Patent Number: 6,029,347

[45] Date of Patent: Feb. 29, 2000

[54] METHOD OF MANUFACTURING A TURBINE OF THERMOSTRUCTURAL COMPOSITE MATERIAL, IN PARTICULAR OF SMALL DIAMETER

[75] Inventors: Jean-Pierre Maumus, Cenon; Guy Martin, St. Aubin Du Medoc, both of France

[73] Assignee: Societe Europenne de Propulsion, Suresnes, France

[21] Appl. No.: 09/059,935

[22] Filed: Apr. 14, 1998

Related U.S. Application Data

[62] Division of application No. 08/689,735, Aug. 13, 1996, Pat. No. 5,775,878.

[30] Foreign Application Priority Data

Aug. 30, 1995 [FR] France .................................. 95 10205

[51] Int. Cl.[7] ..................................................... B23P 15/00

[52] U.S. Cl. .................. 29/889.23; 29/889.1; 29/889.21

[58] Field of Search ............................ 29/889.1, 889.21, 29/889.22, 889.23; 416/183, 186 R, 186 A, 204 R, 204 A, 223 A, 223 B, 241 A, 244 A, 244 R

[56] References Cited

U.S. PATENT DOCUMENTS

| | | | |
|---|---|---|---|
| 3,285,187 | 11/1966 | Anderson, Jr. | 103/115 |
| 3,730,641 | 5/1973 | Gordon | 415/501 |
| 3,845,903 | 11/1974 | Runninger | 29/889.23 |
| 3,905,723 | 9/1975 | Torti, Jr. | 29/889.23 |
| 4,355,954 | 10/1982 | Wilson | 415/143 |
| 4,465,434 | 8/1984 | Rourk | 416/241 A |
| 4,634,344 | 1/1987 | Zager et al. | 416/186 R |
| 4,775,270 | 10/1988 | Katayama et al. | 29/889.23 |
| 4,862,763 | 9/1989 | Stowe, III et al. | 416/230 |
| 5,141,396 | 8/1992 | Schmidt et al. | 416/241 A |
| 5,348,442 | 9/1994 | Harris et al. | 415/55.1 |
| 5,531,633 | 7/1996 | Riley et al. | 29/889.23 |
| 5,538,395 | 7/1996 | Hager et al. | 416/186 R |

FOREIGN PATENT DOCUMENTS

| | | |
|---|---|---|
| 1143291 | 9/1957 | France . |
| 2584106 | 1/1987 | France . |
| 2584107 | 1/1987 | France . |
| 4409629 | 9/1994 | Germany . |
| 553747 | 6/1943 | United Kingdom . |
| 813133 | 5/1959 | United Kingdom . |

*Primary Examiner*—Irene Cuda

*Attorney, Agent, or Firm*—Weingarten, Schurgin, Gagnebin & Hayes LLP

[57] ABSTRACT

A method of manufacturing a turbine comprising a plurality of blades disposed between two end plates and defining flow passages between an inner ring and an outer ring. The turbine is formed by first and second parts, each part made as a single one-piece part out of thermostructural composite material. The first part forms both a first end plate and the blades, and the second part forms the second end plate that is applied against the blades of the first part. The first part and the second part are preferably assembled to each other solely by being clamped together via their central portions.

7 Claims, 3 Drawing Sheets

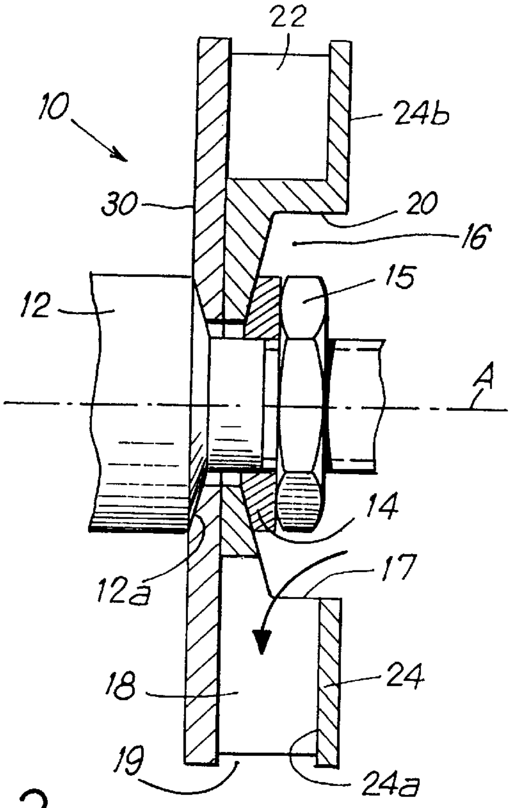
FIG.1
FIG.2
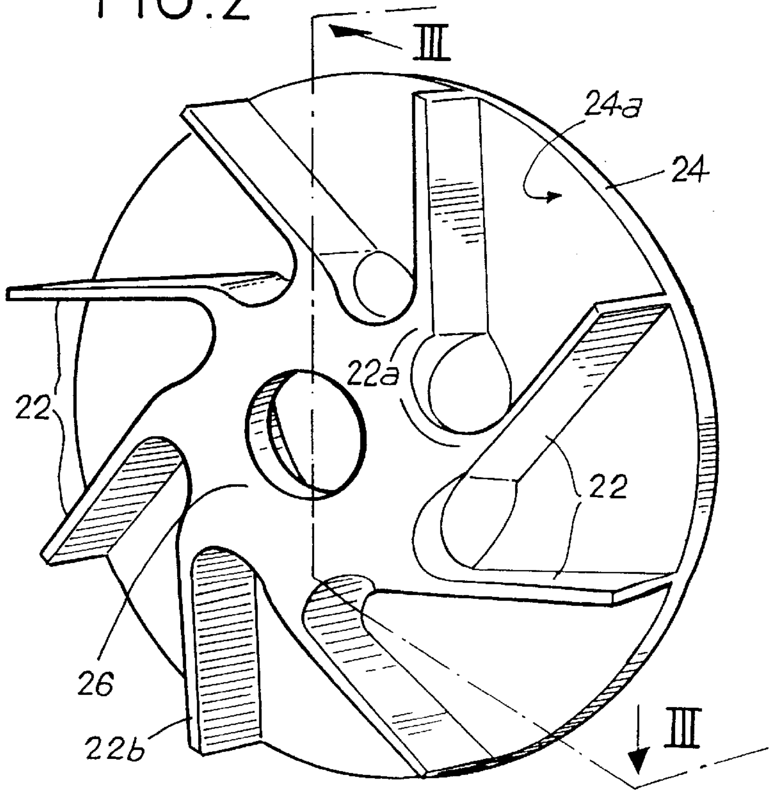
FIG.3
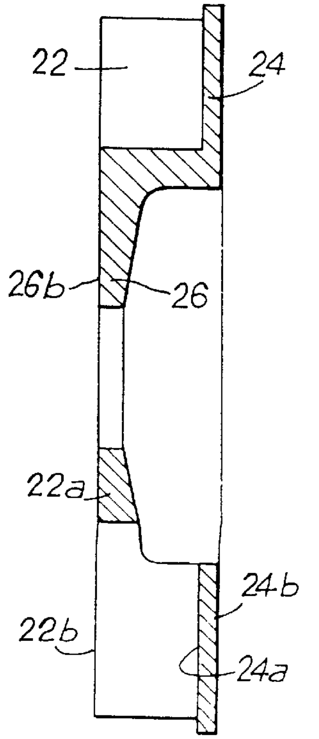

METHOD OF MANUFACTURING A TURBINE OF THERMOSTRUCTURAL COMPOSITE MATERIAL, IN PARTICULAR OF SMALL DIAMETER

This application is a division of Ser. No. 08/689,735 filed Aug. 13, 1996 now U.S. Pat. No. 5,775,878.

The present invention relates to turbines, and more particularly turbines designed to operate at high temperatures, typically greater than 1000° C.

BACKGROUND OF THE INVENTION

One field of application for such turbines is stirring gases or ventilation in ovens or similar installations used for performing physico-chemical treatments at high temperatures, the ambient medium being constituted, for example, by inert or non-reactive gases.

Usually, such turbines are made of metal, generally being built up of a plurality of elements assembled together by welding. The use of metal gives rise to several drawbacks. Thus, the high mass of the rotary parts requires large shaft lines and very powerful motors, and in any event sets a limit on speed of rotation. There is also a temperature limit because of the risk of the metal creeping.

In addition, the sensitivity of metal to thermal shock can give rise to cracks forming or to deformation. This unbalances the rotary mass, leading to a reduction in the lifetime of turbines and of their drive motors. Unfortunately, in the applications mentioned above, severe thermal shock may occur, particularly when massively injecting a cold gas in order to lower the temperature inside an oven quickly for the purpose of reducing the duration of treatment cycles.

In order to avoid the problems encountered with metals, other materials have already been proposed for making turbines, in particular thermostructural composite materials. These materials are generally constituted by a fiber reinforcing fabric, or "preform", which is densified by a matrix, and they are characterized by mechanical properties that make them suitable for constituting structural elements and by their capacity for conserving such properties up to high temperatures. For example, usual thermostructural composite materials are carbon-carbon (C—C) composites constituted by carbon fiber reinforcement and a carbon matrix, and ceramic matrix composites (CMCs) constituted by carbon or ceramic fiber reinforcements and a ceramic matrix.

Compared with metals, thermostructural composite materials have the essential advantages of much lower density and of much greater stability at high temperatures. The reduction in mass and the elimination of any risk of creep can make it possible to operate at high speeds of rotation, and thus at very high ventilation flow rates without requiring overdimensioned drive members. In addition, thermostructural composite materials present very great resistance to thermal shock.

Thermostructural composite materials therefore present considerable advantages with respect to performance, but use thereof is restricted because of their rather high cost. Other than the cost of the materials used, the cost comes essentially from the duration of densification cycles, and from the difficulties encountered in making fiber preforms, particularly when the parts to be manufactured are complex in shape, as is the case for turbines.

OBJECTS AND SUMMARY OF THE INVENTION

Thus, an object of the present invention is to propose manufacture of a turbine architecture that is particularly adapted to being made out of thermostructural composite material so as to be able to benefit from the advantages of such material but with a manufacturing cost that is as low as possible.

In one of its aspects, the present invention provides a method of manufacturing a turbine comprising a plurality of blades disposed between two end plates and defining flow passages between an inner ring and an outer ring, the blades and the end plates being made of thermostructural composite material, in which method:

a) a first part is made as a single one-piece part out of thermostructural composite material to constitute both a first end plate and the blades by implementing the following steps:
   - a first fiber preform is fabricated in the form of a plate having outside dimensions that are selected as a function of the outside dimensions of the first part to be made;
   - the first fiber preform is at least partially densified by a matrix so that the preform is at least consolidated; and
   - the at least partially densified first fiber preform is machined to give it the shape of the first part;

b) a second part forming the second end plate is made as a single one-piece part out of thermostructural composite material by fabricating a second fiber preform, by densifying it with a matrix, and by machining it to form the second end plate; and c) the turbine is assembled by applying the second part against the blades of the first part.

Thus, the turbine is essentially made up of only two parts, thereby simplifying assembly, and each part is made from a fiber preform that is simple in shape. This applies to the second part since it merely forms an end plate, such that the second fiber preform can be constituted merely by a plate. The first part is made by machining a first preform also constituted by a plate, which is usually quite thick. The first fiber preform is preferably machined while it is in the consolidated state, being partially densified, and densification with the matrix is continued after machining.

The machining of the first part gives rise to substantial losses of material, such that the present invention is more particularly, although not exclusively, suitable for turbines of small diameter. The term "turbine of small diameter" is used herein to mean a turbine for which the diameter of the outer ring does not exceed about 500 mm.

According to advantageous feature of the method of the invention, the turbine is assembled by clamping together only the central portions of the first and second parts. It has been found that, because of the rigidity of the composite material, this single clamping operation ensures that the turbine remains assembled together under all operating conditions. This is more particularly true for smaller turbine diameters. There is therefore no need to make use of fasteners of the screw type penetrating into the two parts. This is a significant advantage since otherwise the fasteners used would have had to be made of composite material in order to withstand the high temperatures and in order to have a coefficient of thermal expansion compatible with that of the assembled parts, and that would have increased cost significantly.

The fiber preforms are made by using techniques that are already known. Thus, the first fiber preform, and likewise the second, can be built up as a flat stack of plies of two-dimensional fiber fabric, and the plies can be linked together by needling.

In a variant, and because it needs to be quite thick, the first fiber preform may be made by rolling up a strip of two-dimensional fiber fabric, with the superposed layers thereof being linked together by needling.

In another of its aspects, the invention provides manufacture of a turbine comprising a plurality of blades disposed between two end plates and defining flow passages between an inner ring and an outer ring, the blades and the end plates being made of thermostructural composite material, the turbine being comprising a first part and a second part, each of the parts being made as a single one-piece part out of thermostructural composite material, the first part forming both a first end plate and the blades, while the second part forms the second end plate which is applied against the blades of the first part.

Advantageously, the first part and the second part are assembled to each other solely by clamping their central portions together.

BRIEF DESCRIPTION OF THE DRAWINGS

Other features and advantages of the invention appear on reading the following description given by way of non-limiting indication, and with reference to the accompanying drawings, in which:

FIG. 1 is a section view showing a turbine of the invention mounted on a shaft;

FIG. 2 is a perspective view showing a first component part of the FIG. 1 turbine;

FIG. 3 is a fragmentary section view on planes III—III of FIG. 2;

MORE DETAILED DESCRIPTION

Figure 4:
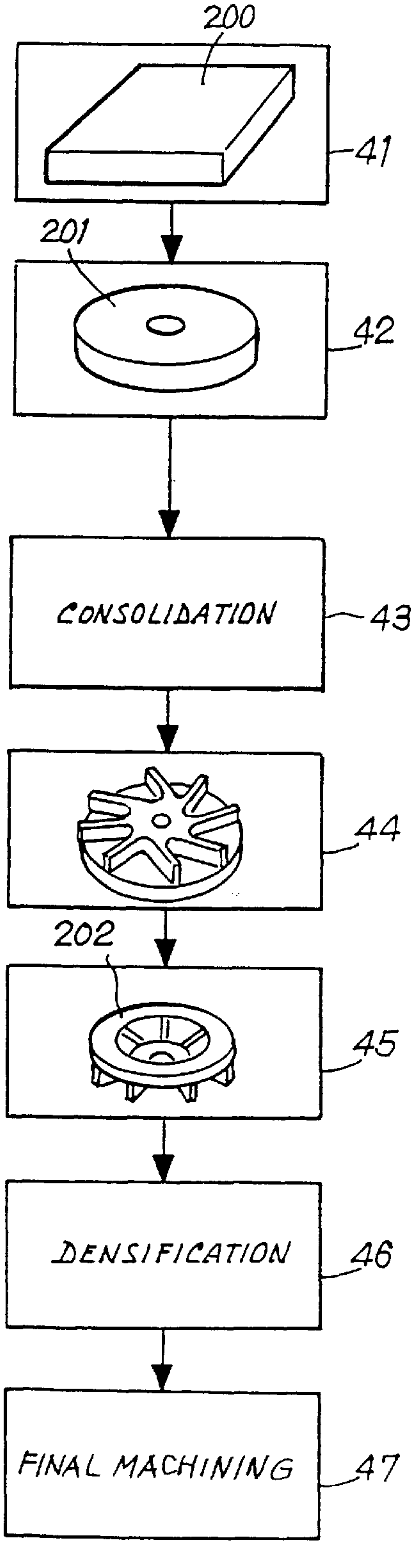
FIG. 4 shows successive steps in making a first component part of the FIG. 1 turbine.

FIG. 1 is a section through a turbine 10 comprising two single-piece parts 20 and 30 of thermostructural composite material that are assembled to each other by being clamped together on a shaft 12. The material from which the parts 20 and 30 are made is, for example, a carbon-carbon (C—C) composite material, or a ceramic matrix composite material such as a C—SiC (carbon reinforcing fibers and silicon carbide matrix) composite material.

The part 20 (FIGS. 1 to 3) comprises a plurality of blades 22 which are situated on an inside face 24*a* of an annular end plate 24 in the form of a disk. The blades 22 extend between the outer circumference and the inner circumference of the end plate 24, and they extend substantially perpendicularly to the plate. The roots 22*a* of the blades 22 connect to a hub-forming central portion 26 whose inside diameter is considerably smaller than that of the end plate 24. Also, the thickness of the hub 26 is less than the width of the blades 22, and it is spaced apart from the end plate 24 along the axis A of the turbine, such that the outside face 24*b* of the end plate and the inside face 26*b* of the hub together with the longitudinal edges 22*b* of the blades constitute opposite faces of the part 20.

The part 30 constitutes a disk-shaped annular end plate whose outside diameter is equal to that of the end plate 24 and whose inside diameter is equal to that of the hub 26.

The part 30 is applied against the outside face 26*b* of the hub 26 and against the longitudinal edges 22*b* of the blades 22. The parts 20 and 30 are clamped together by being held between a shoulder 12*a* on the shaft 12 and a washer 14 secured by a nut 15.

The suction inlet of the turbine is taken from the space 16 situated between the end plate 24 and the hub 26, and it is surrounded by the inner ring 17 of the turbine at the roots of the blades 22. The sucked-in fluid is ejected through the outer ring 19 of the turbine at the ends of the blades 22 after flowing along the passages 18 between the blades 22 and the end plates 24 and 30.

The rigidity of the thermostructural composite material means that the clamping force applied to the central portions of the parts 20 and 30 suffices on its own for holding them assembled together, even while the turbine is in operation, and no separation has been observed. As already mentioned, this is particularly true because the present invention relates preferably to turbines of small diameter, i.e. having an outside diameter that does not exceed about 500 mm.

As shown in FIG. 1, the shoulder 12*a* and the washer 14 bear against surfaces of the hub 26 and of the end plate 30 which are frustoconical in shape, as are the corresponding faces of the shoulder 12*a* and of the washer 14. These frustoconical bearing faces have apexes that substantially coincide on the axis A of the turbine. As a result, thermal expansion differences between the parts 20 and 30 relative to the shaft 12 and the washer 14 give rise to sliding without any destructive effect.

Successive steps in a method of manufacturing the part 20 are shown in FIG. 4. The part 20 is made from a fiber structure in the form of a plate 200 (stage 41). Such a structure is manufactured, for example, by stacking flat plies of two-dimensional fiber fabric, such as a sheet of yarns or cables, woven cloth, . . . , with the plies being linked together by needling. A method of manufacturing fiber structures of this type is described in document FR-A-2 584 106.

A first preform 201 of annular shape is cut from the plate 200, with the dimensions of the preform 201 being selected as a function of the dimensions of the part 20 to be made (stage 42).

The preform 201 is subjected to a first step of densification by the matrix of the thermostructural composite material that is to be made (stage 43). The densification is performed so as to consolidate the preform, i.e. so as to bond the fibers of the preform together sufficiently strongly to enable the consolidated preform to be handled and machined. The densification is performed in known manner by chemical vapor infiltration or by using a liquid, i.e. by impregnation with a precursor for the matrix in the liquid state followed by transformation of the precursor.

The consolidated preform is subjected to a first machining stage during which the blades are formed in one face of the preform (stage 44), and then to a second machining stage during which it is hollowed out in its center from the opposite face so as to form the suction zone while leaving the hub portion in place (stage 45).

The consolidated and machined preform 202 is then subjected to a plurality of densification cycles until the desired degree of matrix densification has been obtained (stage 46).

The preform as finally densified in this manner is subjected to final machining so as to bring the part 20 accurately to its design dimensions (stage 47).

The above description relates to machining the preform after it has been consolidated, but before complete densification, thereby facilitating final densification since it is more difficult to perform uniform densification in a fiber structure that is thick. Nevertheless, the machining could be performed on the perform after it has been densified completely.

Figure 5:
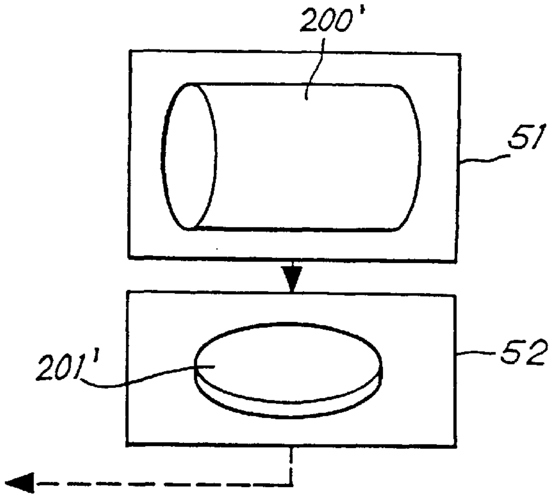
FIG. 5 shows successive steps relating to a variant way of fabricating the preform for making the first component part of the FIG. 1 turbine.

In another variant (FIG. 5), the preform for the part 20 is made from a cylindrical fiber structure 200' fabricated by rolling up a strip of two-dimensional fiber fabric into superposed layers on a mandrel, and by linking the layers together by needling (stage 51). A method of this type for manufacturing fiber structures is described in document FR-A-2 584 107.

Preforms 201' of annular shape are cut out from the cylindrical structure 200' on radial planes (stage 52).

Each preform 201' is then treated in the same manner as the preform 201 of FIG. 4.

Figure 6:
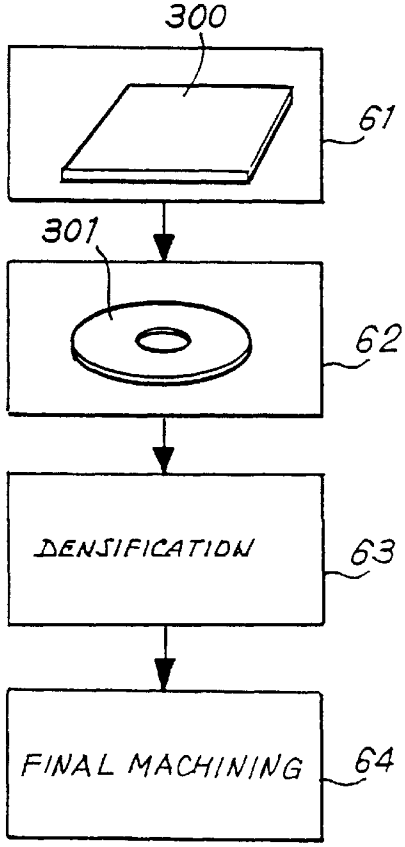
FIG. 6 shows successive steps in making a second component part of the FIG. 1 turbine.

As shown in FIG. 6, the part 30 is made from a plate-shaped fiber structure 300. This structure may be manufactured, for example, by stacking flat plies of two-dimensional fiber fabric and linking the plies together by needling (stage 61).

An annular-shaped preform 301 is cut out from the plate 300, with the dimensions of the preform being selected as a function of the dimensions of the part 30 to be made (stage 62).

The preform 301 is densified by the matrix, densification being performed by chemical vapor infiltration or by means of a liquid (stage 63).

The densified preform is subjected to final machining in order to be brought to the design dimensions of the part 30 (stage 64).

Other embodiments of a turbine using two single-piece parts of thermostructural composite material defining two end plates with blades and a hub could be adopted.

Figure 7:
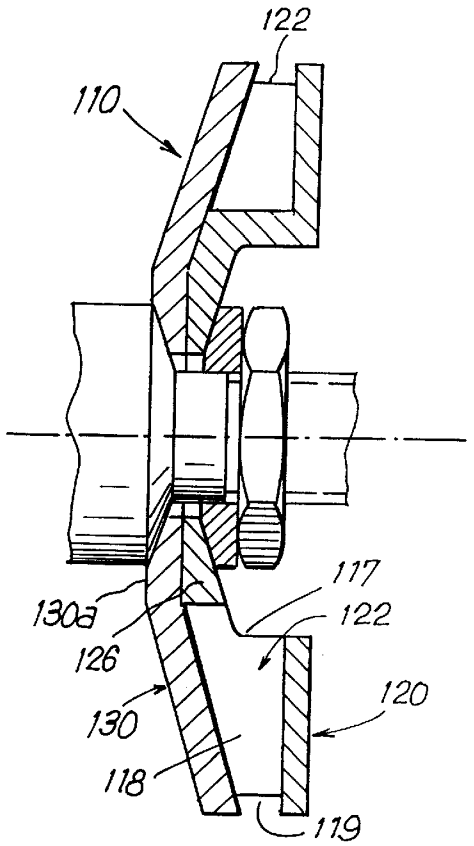
FIG. 7 is a section view showing a variant embodiment of a turbine of the invention.

The turbine 110 of FIG. 7 is made essentially of two parts 120 and 130 of thermostructural composite material. It differs from the turbine of FIG. 1 in that in the part 120, the height of the blades 122 tapers from the inner ring 117 towards the outer ring 119 of the turbine. This tapering height makes it possible to compensate for the fact that the width of the passages 118 between the blades 122 increases between the inner ring and the outer ring, with the taper ensuring that the inlet and outlet sections of the passages 118 are substantially equal.

The end plate 130 applied against the part 120 is thus in the form of a disk in its central portion 130*a* where it is applied against the hub 126, and in the form of a truncated cone in its peripheral portion that is applied against the blades 122.

To make the end plate 130, it is possible to start from a disk-shaped annular fiber preform which is put into the desired shape by means of tooling, and is then consolidated by partial densification while it is held in the tooling. After consolidation, the preform can be removed from the tooling for further densification.

As already mentioned, the present invention applies more particularly to turbines of relatively small diameter. The flow rate of the turbine can be increased or decreased, for given diameter, by increasing or decreasing the height of the passages, i.e. the thickness of the turbine. Since the amount of material lost during machining of the blade increases with blade height, it is preferable for reasons of cost to limit the thickness of the turbine, e.g. so that it does not exceed about 100 mm.

Figure 8:
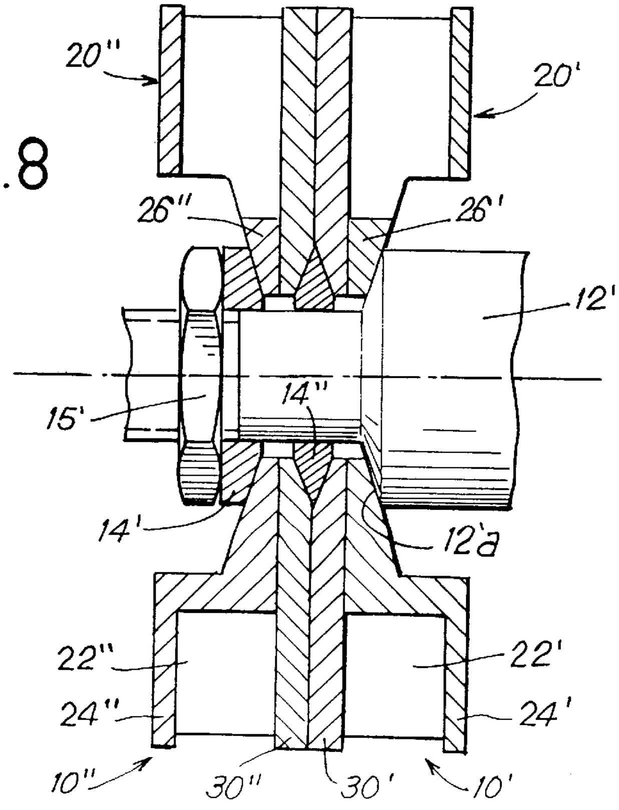
FIG. 8 is a section view showing another variant embodiment of a turbine of the invention.

One way of increasing flow rate then consists in coupling together two turbines 10' and 10" on a common shaft as shown in FIG. 8. Each turbine 10' and 10" comprises two single-piece parts of thermostructural composite material: a first part 20', 20" simultaneously forming blades 22', 22", an end plate 24', 24", and a hub 26', 26"; and a second part 30', 30" forming an end plate.

The turbine 10' is similar to turbine 10 of FIG. 1, whereas the turbine 10" differs therefrom by the way in which its blades are disposed. The disposition of the blades 22" on the part 20" is symmetrical about a radial plane of the disposition of the blades 22' on the part 20'. As a result, when the turbines 10' and 10" are placed in mutual contact via the outside faces of the end plates 24' and 24", the blades 22' and 22" define flow passages that are oriented in the same manner about the common axis of the turbines.

The parts 20', 30', 30", and 20" are assembled to one another by being clamped together on a common shaft 12' between a shoulder 12'*a* and a washer 14', by means of a nut 15'. The surfaces of the hubs 26' and 26" against which the shoulder 12'*a* and the washer 14' bear are frustoconical in shape, as are the corresponding faces of the shoulder 12'*a* and of the washer 14'. An additional washer 14" of triangular section is interposed between the end plates 30' and 30", with the surfaces thereof that bear against the washer 14" being frustoconical in shape. The frustoconical bearing surfaces between the end plate 30' and the washer 14", and between the hub 26' and the shoulder 12'*a,* have apexes that substantially coincide on the axis of the turbines, and the same applies to the bearing surfaces between the end plate 30" and the washer 14", and between the hub 26" and the washer 14'. As a result, changes in dimensions due to temperature between the turbine-forming parts and the shaft and the clamping washers can be compensated by sliding parallel to the frustoconical bearing surfaces, in the same manner as for the turbine 10 of FIG. 1.

We claim:

1. A method of manufacturing a turbine comprising a plurality of blades disposed between first and second end plates, the blades and the first and second end plates being made of a thermostructural composite material, the method comprising the steps of:

a) forming a first part as a single one-piece part from a thermostructural composite material to comprise both the first end plate and the blades, the step of forming the first part further comprising:
  - fabricating a first fiber preform in the form of a plate having outside dimensions that are selected as a function of the outside dimensions of the first part;
  - densifying the first fiber preform at least partially by a matrix so that the first fiber preform is at least consolidated; and
  - machining the at least partially densified first fiber preform to give it the shape of the first part;

b) forming a second part as a single one-piece part from a thermostructural composite material to comprise the second end plate, the step of forming the second part further comprising:
  - fabricating a second fiber preform;
  - densifying the second fiber preform with a matrix; and
  - machining the second fiber preform to form the second end plate; and c) assembling the turbine by applying the second part against the blades of the first part.

2. The method according to claim 1, wherein, in step a, further including continuing with densification of the first fiber preform with a matrix after the step of machining the first fiber preform.

3. The method according to claim 1, wherein the step of machining the first fiber preform in the form of an at least partially densified disk further comprises:

making the blades by machining from one face of the plate; and hollowing out a central portion of the plate from the opposite face thereof to make a suction zone, while leaving a central hub.

4. The method of claim 1, wherein the step of fabricating the first fiber preform further comprises:

providing a flat stack of plies of a two-dimensional fiber fabric; and linking the plies together by needling.

5. The method of claim 1, wherein the step of fabricating the first fiber preform further comprises:

rolling a strip of two-dimensional fiber fabric into superposed layers; and linking the layers together by needling.

6. The method of claim 1, wherein the step of fabricating the second fiber preform further comprises:

providing a flat stack of plies of a two-dimensional fiber fabric; and linking the plies together by needling.

7. The method of claim 1, wherein the step of assembling the turbine further comprises clamping together the first part and the second part solely in the central portions thereof.

* * * * *